July 29, 1930.  E. A. ANDERSON  1,771,566
DIRECTION SIGNAL FOR VEHICLES
Filed Jan. 31, 1929   2 Sheets-Sheet 1
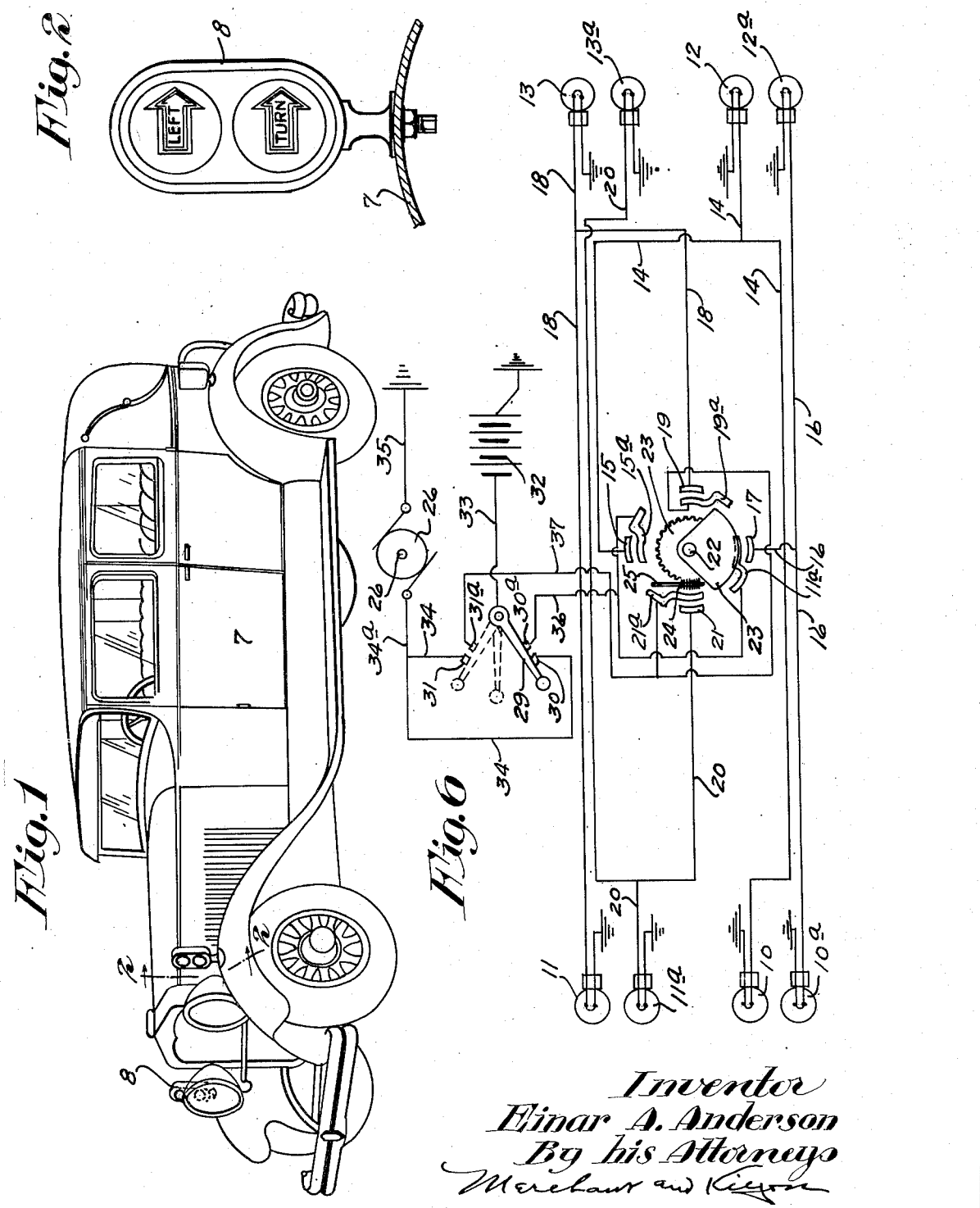
Inventor
Einar A. Anderson
By his Attorneys
Merchant and Kieyon July 29, 1930.  E. A. ANDERSON  1,771,566
DIRECTION SIGNAL FOR VEHICLES
Filed Jan. 31, 1929   2 Sheets-Sheet 2
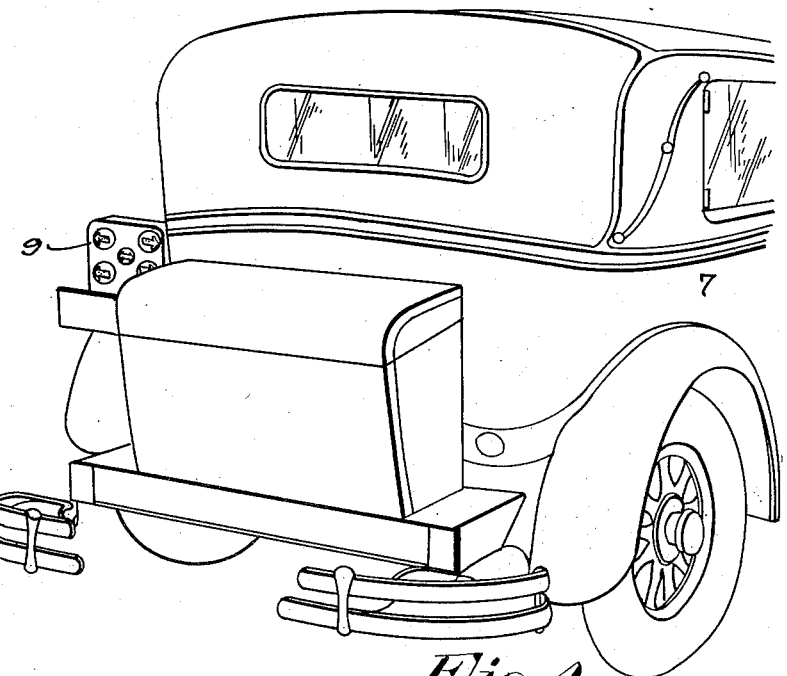
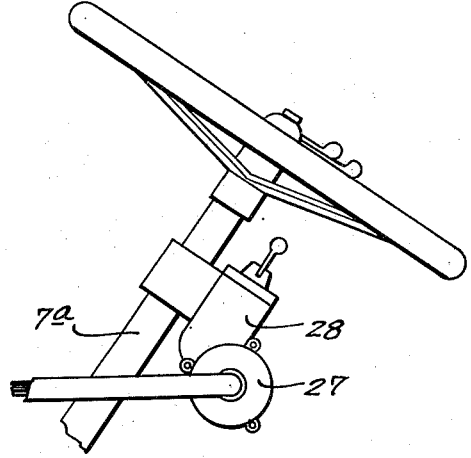
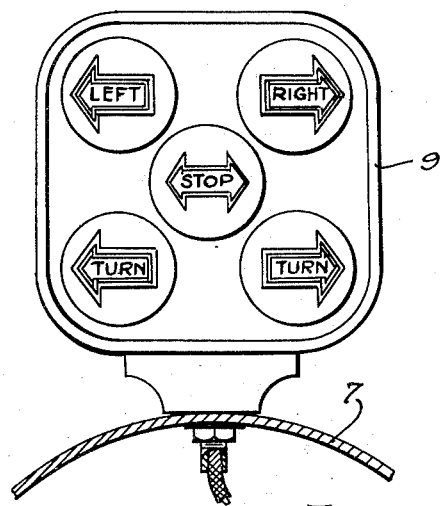
Inventor
Einar A. Anderson
By his Attorneys
Merchant and Kilgore Patented July 29, 1930

1,771,566

UNITED STATES PATENT OFFICE

EINAR A. ANDERSON, OF MINNEAPOLIS, MINNESOTA

DIRECTION-SIGNAL FOR VEHICLES

Application filed January 31, 1929. Serial No. 336,493.

My invention provides a simple and highly efficient direction indicator for automobiles whereby the direction signals will be produced with a flashing action preferably both at front and rear of the vehicle. For example, if the machine is about to turn toward the left, the signals at front and rear will be flashed to indicate, alternately, left-turn-left-turn, and if the vehicle is about to be turned to the right, the signals at front and rear will be flashed to indicate, alternately, right-turn-right-turn. The flashing of these signals, it has been found, will much more quickly attract attention than will simply the steady illumination of a signal indicating right or left turn.

In carrying out the invention, properly arranged signal lamps will be applied to the front and the rear of the vehicle and these lamps will be connected in a circuit that includes, in addition to the lamps and co-operating means for flashing the signals right and left turn as above noted, (a) a control switch arranged to be set at will in a neutral position for no indication whatever, in a position at the right for flashing of right-turn signals, and in a position at the left for left-turn signals; (b) a rotary flasher switch for successively opening and closing the circuits to the lamps for proper indications; and (c) a small electric motor for driving the rotating member of the flasher switch and having a circuit arranged to be opened in the neutral position of the control switch, but to be closed when the control switch is set either for right or left indications.

A preferred embodiment of the invention is illustrated in the accompanying drawings, wherein like characters indicate like parts throughout the several views.

Referring to the drawings:

Fig. 1 is a perspective showing the direction indicators applied to an automobile of standard construction;

Fig. 2 is a detail in section taken approximately on the line 2—2 of Fig. 1 and showing one of the front direction indicators;

Fig. 3 is a perspective showing the rear portion of the automobile illustrated in Fig. 1 and showing the rear direction indicator;

Fig. 4 is a rear elevation of the rear direction indicator showing the rear fender to which it is applied in transverse section;

Fig. 5 is a side elevation showing the manner in which the casing which contains the control switch, the flasher switch and the motor may be conveniently applied to the steering post of the automobile; and Fig. 6 is a diagrammatic view illustrating the manner in which the various parts of the complete direction indicator are electrically connected.

The automobile is indicated as an entirety by the numeral 7. The arrangement of the several lamps or signal devices that make up the complete direction indicator may be varied, but preferably they are arranged in three casings, to wit: two front casings 8 and one rear casing 9. As shown, the front casings 8 are applied one to each of the front fenders and the rear casing 9 is applied to the left-hand and rear fender of the automobile.

In the left-hand front casing 8 is a pair of electric light bulbs 10 and 10ª; in the right-hand front casing 8 is a pair of light bulbs 11 and 11ª; and in the rear casing 9 is two pairs of light bulbs 12—12ª and 13—13ª. The bulbs 10—10ª and 12—12ª are for flashing left-turn signals, while the bulbs 11—11ª and 13—13ª are for flashing right-turn signals. As shown, all of these light bulbs are grounded on one side and on their other sides are electrically connected to contacts of the flashing switch, as follows: Left-hand front bulb 10 and left-hand rear bulb 12 are by leads 14 connected to the fixed contact 15; left-hand front bulb 10ª and left-hand rear bulb 12ª are by leads 16 connected to fixed contact 17 that is diametrically opposite the contact 15; right-hand front bulb 11 and right-hand rear bulb 13 are by leads 18 connected to the fixed contact 19 that is ninety degrees from or midway between contacts 15 and 17; and right-hand front bulb 11ª and right-hand rear bulb 13ª are by leads 20 connected to fixed contact 21 that is diametrically opposite the fixed contact 19. Contacts 15, 17, 19 and 21 are the fixed contacts of the flasher switch and they are arranged for co-operation with but are normally disengaged from relatively movable contacts 15ª, 17ª, 19ª and 21ª, respectively, of the same switch.

Mounted to rotate on an axis that is central in respect to the several surrounding contacts just described is a shaft 22 which, as shown, carries a worm gear 23 and a segmental cam-acting contact closer 23ª. Worm gear 23 is engaged by a small worm 24 carried by a small shaft 25 which is arranged to be driven by a small electric motor 26, which motor in the diagram view, Fig. 6, is separated from said worm gear and contact closer. In practice, however, it will be advisable to mount the above parts of the flasher switch in a casing 27 and the motor and the casing 28 and which casing, as shown in Fig. 5, may be secured to the steering post 7ª of the automobile.

The controller switch above referred to is preferably in the form of a lever 29 pivoted on the motor casing 28 and arranged to be engaged at will either with a pair of contacts 30—30ª or with a pair of similar spaced contacts 31—31ª. When switch 29 is in an intermediate or neutral position, it will be out of engagement with all of said contacts just noted. The numeral 32 indicates a storage battery which may be the battery of the car or an independent battery. This battery, on one side, is grounded and at its other side is connected to the control switch 29 by a lead 33. Contacts 30—31 are connected by a lead 34 and both of these contacts are connected through said lead 34 and an extension lead 34ª to one side of the motor 26, and said motor on its other side being grounded to a lead 35. Contact 30ª by leads 36 is connected to the diametrically opposite relatively movable flasher contacts 15ª and 17ª while the contact 31ª by leads 37 is connected to the diametrically opposite flasher contacts 19ª and 21ª.

It should now be noted that the arrangement of the contact closer 23 and its co-operating parts are such that when the motor is thrown into action, said segment will be revolved and will progressively engage the movable contacts 19ª, 15ª, 21ª and 17ª, and will force the said contacts respectively into engagement with the co-operating fixed contacts 19, 15, 21 and 17 thereby producing signals or direction indications as presently to be more definitely described.

The front casings 8 on their front faces, respectively, in front of the light bulbs 10 and 11 are provided with transparent or translucent light-emitting passages that indicate, respectively, "left" and "right", while in front of the bulbs 10ª and 11ª they are provided with transparent or translucent light-emitting passages that indicate "turn". The rear casing 9 at its rear face is provided at the rear, respectively, of bulbs 12 and 13 with light-emitting passages that indicate, respectively, "left" and "right", while aligned with bulbs 12ª and 13ª, said casing 9 is provided with light-emitting passages that indicate "turn". The casing 9 at its central portion is shown as provided with a stop-indicating signal which constitutes no part of the present invention and which, if employed, would be under control of a lamp and circuit arranged to be opened and closed by the manipulation of the brake pedal.

In a general way, the operation of this direction-indicating mechanism has already been indicated, but a more exact operation thereof may be traced as follows: When the control switch 29 is in its intermediate or neutral position, all the leads will be out and the motor 26 will be idle. When switch 29 is moved to either extreme position, the motor circuit will be closed and the motor, being thrown into action, will cause rotation of the segmental contact maker or cam 23, which, as already stated, will successively engage the movable contacts of the flasher switch. If control switch 29 is set toward the left, as shown in Fig. 6, the battery works to the front and rear bulbs 10—10ª and 12—12ª will be closed between contacts 30 and 30ª and the circuits to these lamps will then be alternately closed as follows:

When contact-closing circuit 23 moving in a counter-clockwise direction, presses contact 19ª against contact 19, the circuit through the light bulbs that flash "right turn" signals will not be closed because the circuit will then be broken between contacts 31 and 31ª, and the same statement will be true when contact 23 later forces contact 21ª against contact 21. When, however, segment 23 forces contact 15ª against contact 15, circuits to front and rear lamps 10 and 12, which lamps indicate "left" will be closed thereby flashing the signal "left" and when segment 23 forces contact 17ª against contact 17, circuits to front and rear lamps 10ª and 12ª will be closed, thereby giving the signal "turn"; and, of course, these signals "left" and "turn" will alternately be flashed as long as lever 29 remains in its position shown by full lines in Figure 6. When control lever 29 is set in its extreme position toward the right or against contacts 31 or 31ª, the flashing operation just described will then take place through the front and rear lamps 11—11ª and 13—13ª and the front bulbs for indicating "left turn" will remain dormant and in open circuits because their circuits will then be open between the contacts 30—30ª.

The direction-indicating system described is not only efficient for the purposes had in view, but may be readily applied to automobiles or other vehicles. It will be understood that in connection with the drawings, I have illustrated a preferred arrangement which, however, may be modified within the scope of the invention herein disclosed and claimed.

The invention above described may be carried out in connection with various auxiliary indications such as direction-indicating arrows and signals flashed in color. For example, the signals flashed to indicate left-turn might be in red and the signals flashed to indicate right-turns in green.

What I claim is:

A direction indicator for vehicles comprising a plurality of complete, elongated, vertically spaced, electric indicators, each indicator having its own light bulb and supply circuit, each constructed to completely announce the same direction turn, and electric circuits therefor including a flasher switch which latter, when thrown into action will alternately close the circuit through said individual indicators and thereby produce a flashing action by illuminating first the one and then the other of the said indicators.

In testimony whereof I affix my signature.

EINAR A. ANDERSON.